US009405465B2

(12) United States Patent
Sinnaduray

(10) Patent No.: US 9,405,465 B2
(45) Date of Patent: Aug. 2, 2016

(54) RESIZING PREDICTIVE KEYBOARD

(71) Applicant: CELLCO PARTNERSHIP, Basking Ridge, NJ (US)

(72) Inventor: David Sanjiv Sinnaduray, Costa Mesa, CA (US)

(73) Assignee: Cellco Partnership, Basking Ridge, NJ (US)

( * ) Notice: Subject to any disclaimer, the term of this patent is extended or adjusted under 35 U.S.C. 154(b) by 230 days.

(21) Appl. No.: 14/018,395

(22) Filed: Sep. 4, 2013

(65) Prior Publication Data

US 2015/0062184 A1 Mar. 5, 2015

(51) Int. Cl.
*G06G 5/00* (2006.01)
*G06F 3/0488* (2013.01)
*G06F 17/27* (2006.01)

(52) U.S. Cl.
CPC .......... *G06F 3/04886* (2013.01); *G06F 17/276* (2013.01); *G06F 2203/04806* (2013.01)

(58) Field of Classification Search
None
See application file for complete search history.

(56) References Cited

U.S. PATENT DOCUMENTS

| 2011/0029862 A1* | 2/2011 | Scott et al. ..................... 715/261 |
| 2011/0074685 A1* | 3/2011 | Causey et al. .................. 345/168 |
| 2015/0040055 A1* | 2/2015 | Zhao .................... G06F 3/04886 715/773 |

* cited by examiner

*Primary Examiner* — Peter Hoang

(57) ABSTRACT

Systems and methods for keypad button resizing are disclosed. In some implementations, a keypad including multiple characters is displayed on a display of a touchscreen device. A selection of one of the multiple characters on the keypad is received. For each character in the multiple characters on the keypad, a likelihood value that the character is a next character to be typed is predicted and a button size for the character is selected based on the predicted likelihood value. The keypad is modified based on the selected button size for each character. The modified keypad is displayed on the display of the touchscreen device.

20 Claims, 6 Drawing Sheets

RESIZING PREDICTIVE KEYBOARD

BACKGROUND

QWERTY keyboards, which were originally designed for large typewriters, now appear on small touchscreen devices, for example mobile phones. A large QWERTY keyboard on a typewriter or full-size desktop or laptop computer is convenient because each character button is larger than a user's finger pad, allowing the user to easily touch each button and minimizing "fat fingering" or failure to touch a character button the user wishes to type due to the size of the button. However, QWERTY keyboards were not designed to fit into the small space of a mobile device touchscreen. When a QWERTY keyboard is placed on such a touchscreen, the buttons are very small, resulting in frequent "fat fingering," especially by users who have large fingers or are unfamiliar with mobile device touchscreen keyboards. As the foregoing illustrates, a new approach for providing a keyboard on a touchscreen of a mobile device may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
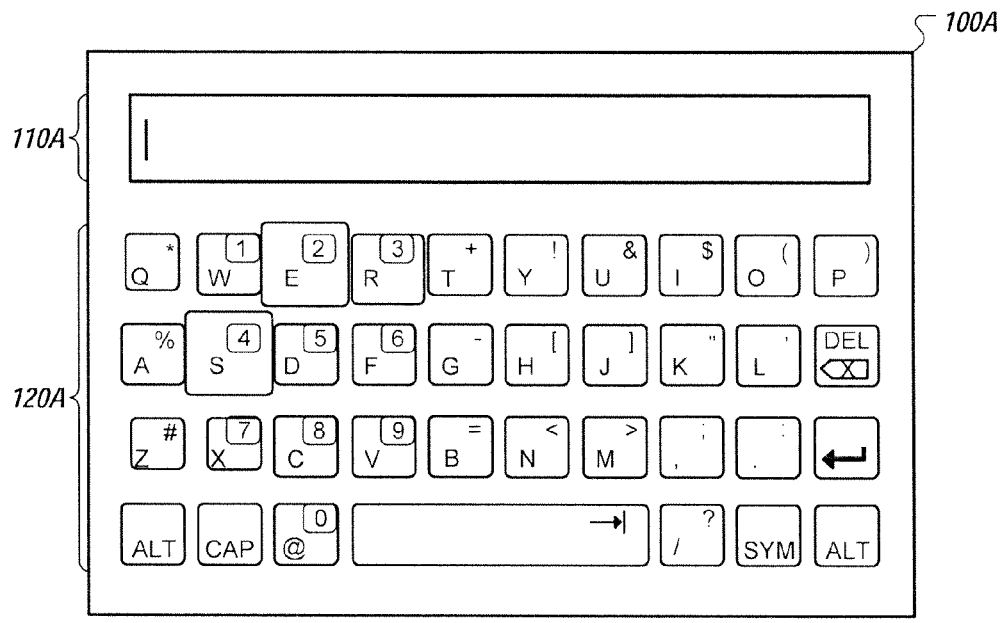
FIGS. 1A-1D illustrate exemplary displays of a touchscreen device configured to modify a displayed keypad.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for displaying a keypad on a touchscreen device. The character buttons that appear as individual "soft" keys on the keypad are arranged in a predefined order, for example, the QWERTY order. However, the character buttons are resized based on a likelihood that each character will be the next character typed by the user. The likelihood that each character will be the next character typed by the user can be determined by analyzing text previously typed by the user, where the text may be part of short messaging service (SMS) messages, e-mail messages, and/or word processing documents. The previously typed text may include previously typed text in all applications or only in a single application, as the user may use a different linguistic or typing style in different applications. For example, a user may use a more formal linguistic or typing style in his/her corporate email application and a less formal linguistic or typing style in his/her SMS application. Alternatively, the likelihood that each character will be the next character typed by the user can be determined based on analysis of a dictionary of a natural language (e.g., the English language) and a word-frequency chart for the natural language. Each of these can be used to determine a likelihood that one character follows another character in a typed text.

For example, if the first letter of a word is the letter 'A,' there is a certain probability that the next letter is the letter 'B' (e.g., as in the word "abstract") and a certain probability that the next letter is the letter 'C' (e.g., as in the word "actor"). Responsive to these likelihoods, after the user types the letter 'A' as the first letter of a work (e.g., after a blank space), the characters buttons for 'B' and 'C' on the keypad of the touchscreen may be resized. After the user types the second letter, for example, 'B,' there is a certain probability that the next (third) letter is 'A' (e.g., as in the word "abacus") and a certain probability that the next letter is 'S' (e.g., "as in the word "abstract"). Responsive to these likelihoods, the character buttons for 'A' and 'S' on the keypad of the touchscreen may be resized. As a result of this resizing technique, fat fingering may be reduced as the character buttons that the user is more likely to need are larger and, therefore, easier to touch with a finger or stylus.

In some examples, each character button is pegged to a focal point. In other words, a center point for the character button is predetermined. The character button may be made larger or smaller but may be centered at the center point regardless of its size. In some implementations, the total size of the keypad is ensured to be constant, for example, equal to a length or width of a touchscreen display or occupying a predetermined proportion e.g., 30%, of the size of the touchscreen display. As a result, if some character(s) on the keypad are increased in size, other character(s) may be decreased in size by an equivalent amount. For example, if the size increases in the keypad include increasing the size of the character button for 'U' by two units in the vertical direction and two units in the horizontal direction and increasing the size of the character 'T' by one unit in the vertical direction and one unit in the horizontal direction, the size decreases in the keypad may, in some cases, add up to three units of size decrease. In some examples, the above total size increase ideas can be enforced on a single row of the keypad (e.g., the top row of the QWERTY keypad with the characters QWERTYUIOP.

In some implementations, certain buttons, for example, a SPACE, DELETE, ENTER, or SHIFT button, may not be resized according to the techniques disclosed herein to ensure that these buttons are consistently presented. In some examples, a toggle button may be presented for the user to be able to turn character button resizing on the keypad on or off. Also, character resizing may be automatically turned off when the user is typing sensitive information, for example, a password. In some cases, character resizing may be automatically turned off if the user's typing speed exceeds the processing speed used by the touch screen for resizing the character buttons on the keypad.

FIGS. 1A-1D illustrate exemplary displays 100A, 100B, 100C, and 100D of a touchscreen device configured to modify a displayed keypad. The touchscreen device may be, for example, a mobile phone, a tablet computer, a digital music player, a personal digital assistant (PDA), a laptop or desktop computer including a touchscreen and an on-screen keypad, etc. The displays 100A, 100B, 100C, and 100D may be presented on the touchscreen of the device.

The display 100A of FIG. 1A may be shown when a user of the touchscreen device instantiates an application or accesses a portion of an application that requires typing and causes a keypad to appear. The application that requires typing may be, for example, a text messaging application or a word processing application. The portion of the application that requires typing may be, for example, a text input box in a web browser application or a compose message portion of an email reading and writing application.

As shown, the display 100A includes a text input box 110A and a keypad 120A. The text input box 110A is blank, as the user has not typed anything in the text input box yet. On the keypad 120A, a button size for the characters 'E' and 'S' is increased greatly. A button size for the character 'R' is increased slightly. A button size for the characters 'Z' and 'X' is decreased greatly. A button size for the character 'Q' is decreased slightly. The modification of the size of the character buttons is based on a prediction, by the touchscreen device, that the user is likely to type the characters 'E,' or 'S' as the first character and unlikely to type the characters 'Z' or 'X' as the first character. The likelihood of typing the characters 'E' or 'S' exceeds the likelihood of typing the character 'R', which exceeds the likelihood of a character of the default size (e.g., 'P'), which exceeds the likelihood of typing the character 'Q', which exceeds the likelihood of typing the characters 'Z' or 'X'. This prediction of the likelihood(s) of typing character(s) may be based on an analysis of a set of words and/or a word usage frequency for the set of words. The set of words may include one or more of: a set of words typed by the user of the touchscreen device, a set of words typed by the user of the touchscreen device in a specified application, a set of first words typed into text input boxes by the user of the touchscreen device, a set of words in a dictionary of a default language of the touchscreen device, a set of words in a text (e.g., one or more books) in the default language of the touchscreen device, etc.

Figure 1B:
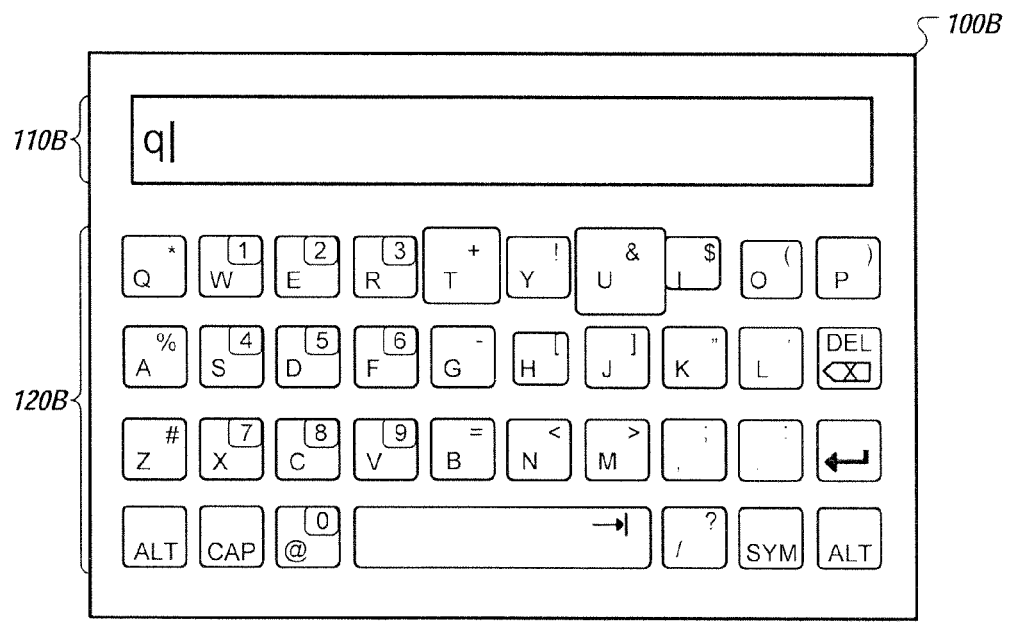

The user of the touchscreen device viewing the display 100A may use the keypad 120A to type a character into the text input box 110A. For example, as shown in FIG. 1B, the user has typed the character 'q' into the text input box 110B, causing the display 100B to be presented. The display 100B includes the text input box 110B and the keypad 120B. As shown in the keypad 120B, a button size for the character 'U' is increased. A button size for the character 'T' is also increased, but to a lesser degree than that for the character 'U'. A button size for the characters 'I' and 'H' is decreased. Furthermore, button sizes for the characters in the keypad 120B are modified differently from button sizes for the characters in keypad 120A. For example, the button size for the character 'E' is increased in keypad 120A and regular sized in keypad 120B. The button sizes of the characters in the keypad 120B may be determined based on one or more characters ('Q') already typed in the input box 110B and based on an analysis of a set of words and/or a word usage frequency for the set of words. The set of words may include one or more of: a set of words typed by the user of the touchscreen device, a set of words typed by the user of the touchscreen device in a specified application, a set of first words typed into text input boxes by the user of the touchscreen device, a set of words in a dictionary of a default language of the touchscreen device, a set of words in a text (e.g., one or more books, for instance, the books *A Tale of Two Cities* by Charles Dickens and *The Call of the Wild* by Jack London for a touchscreen device having a default language of English or the book *Le Petit Prince* by Antoine de Saint-Exupery for a touchscreen device having a default language of French) in the default language of the touchscreen device, words that begin with the character (s) already typed, etc. For example, if the first letter of a word is 'Q', the second letter is most likely to be 'U', less likely to be 'T', even less likely to be a character of unchanged size (e.g., 'P') in the keypad 120B, and even less likely to be a character of decreased size (e.g., 'I' or 'H') in the keypad 120B.

The set of words typed by the user of the touchscreen device, referenced above, may include word in email(s), text message(s), note(s), document processing application(s), etc., typed by the user. The set of words or first words typed by the user of the touchscreen device in the specified application may include words or first words typed using one of the above-listed applications. The set of words in the dictionary of the default language of the touchscreen device may be a set of words in a dictionary (e.g., an English language dictionary) coupled with a word usage frequency for each word.

Figure 1C:
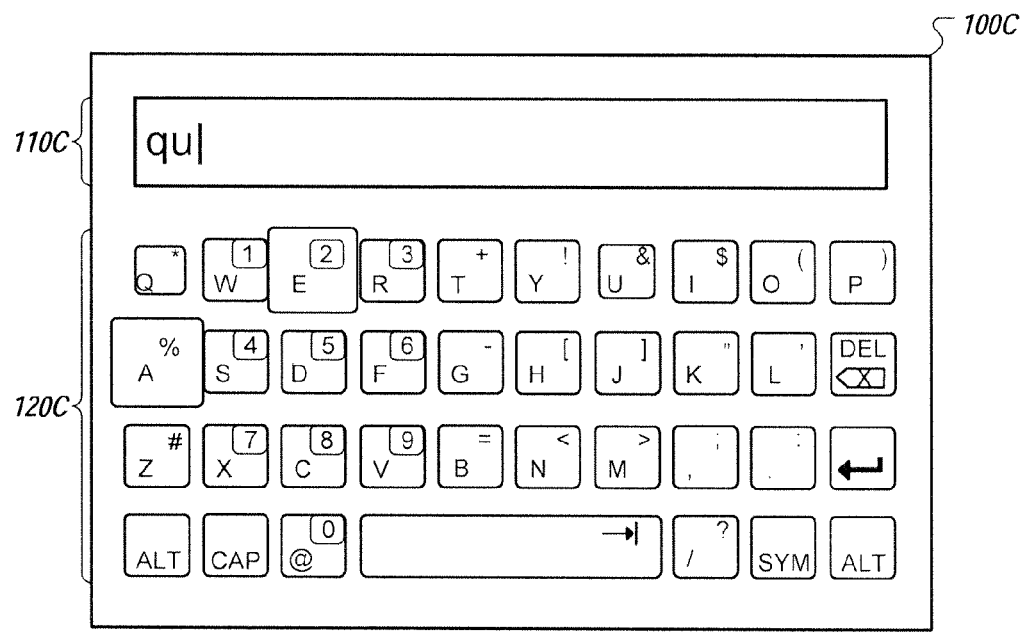

The user of the touchscreen device viewing the display 100B may use the keypad 120B to type a character into the text input box 110B. For example, as shown in FIG. 1C, the user has typed the character 'u' into the text input box 110C, causing the display 100C to be presented. The display 100C includes the text input box 110C including the text "qu" and the keypad 120C. The keypad 120C features increased button sizes for the characters 'E' and 'A' and decreased button sizes for the characters 'Q' and 'U', as the next typed character is more likely to be 'E' or 'A' than a character of default size (e.g., 'T') and less likely to be 'Q' or 'U' than a character of default size. The likelihood for each character to be the next typed character can be determined based on the text already typed in the input box ("qu") and any of the factors set for the above.

Figure 1D:
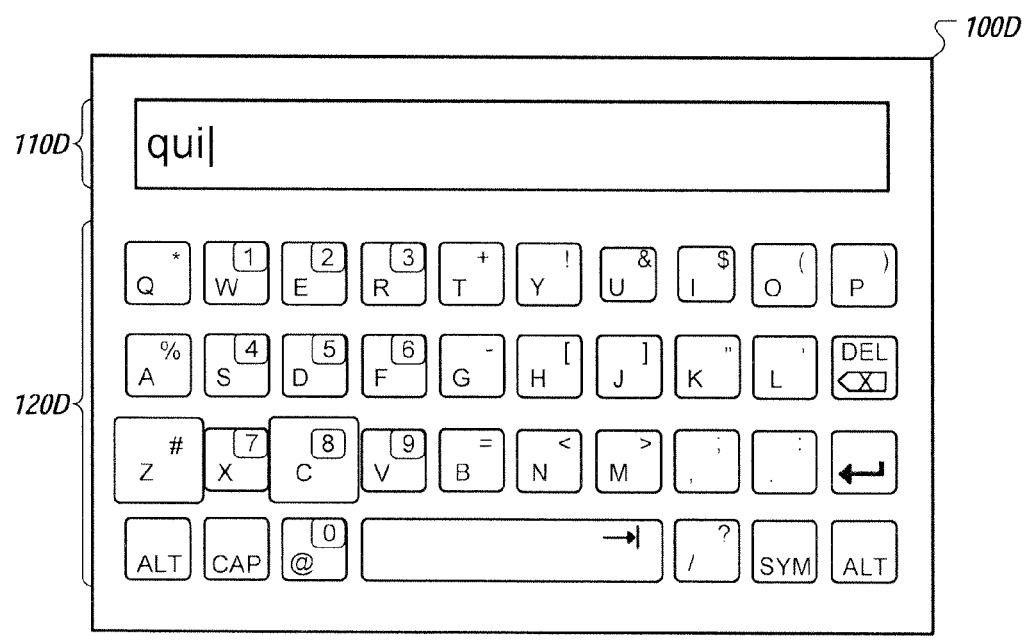

The user of the touchscreen device viewing the display 100C may use the keypad 120C to type a character into the text input box 110C. For example, as shown in FIG. 1D, the user has typed the character 'i' into the text input box 110D, causing the display 100D to be presented. The display 100D includes the text input box 110D including the text "qui" and the keypad 120D. The keypad 120D features increased button sizes for the characters 'Z' and 'C' and decreased button sizes for the characters 'U' and 'I', as the next typed character is more likely to be 'Z' or 'C' than a character of default size (e.g., 'T') and less likely to be 'U' or 'I' than a character of default size. The likelihood for each character to be the next typed character can be determined based on the text already typed in the input box ("qui") and any of the factors set for the above. Thus, with each letter added in the text input box, at least some of the button sizes of the different letters may be changed on the corresponding display.

Figure 2:
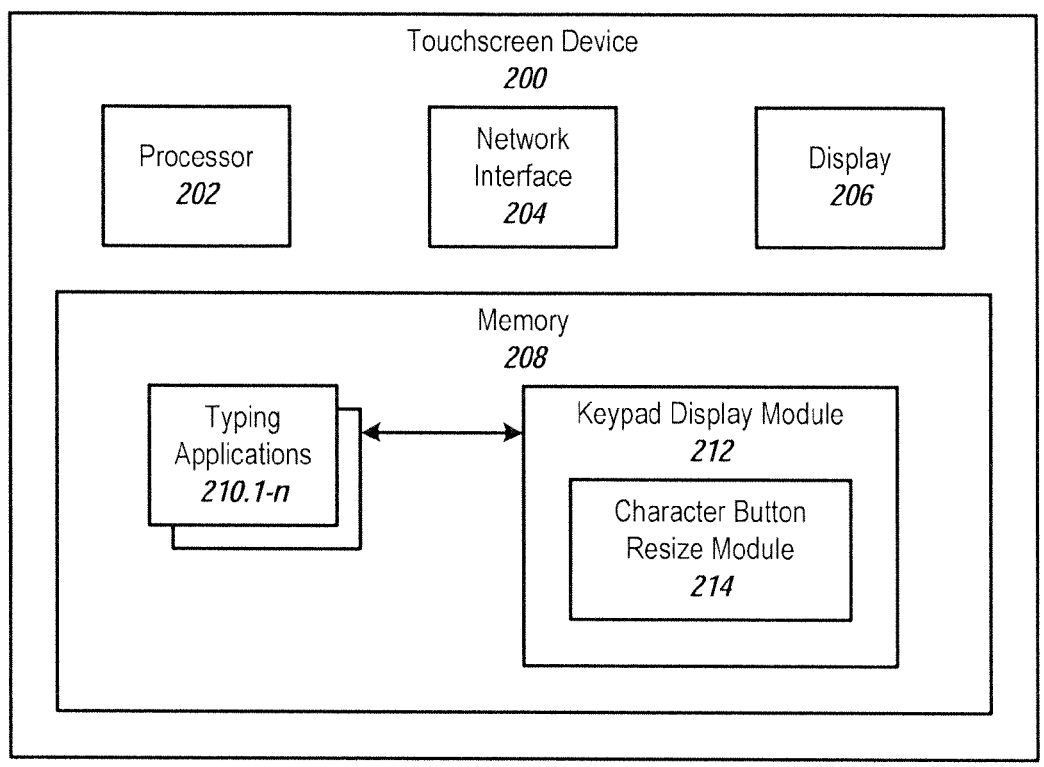
FIG. 2 is a block diagram of an exemplary touchscreen device.

FIG. 2 is a block diagram of an exemplary touchscreen device 200. The touchscreen device 200 may be any computing device implementing a touchscreen display, for example, a mobile phone, a tablet computer, a digital music player, a personal digital assistant (PDA), a laptop or desktop computer including a touchscreen and an on-screen keypad, etc. As shown, the touchscreen device 200 includes a processor 202, a network interface 204, a display 206, and a memory 208.

The processor 202 is configured to execute instructions stored in a machine-readable medium such as, for example, the memory 208. While a single processor 202 is illustrated, the touchscreen device 200 may include a single processor 202 or multiple processors 202. The network interface 204 includes an interface for transmitting and/or receiving data in a network, for example, a wired network, a wireless network, a local area network, a wide area network, the Internet, a cellular network, etc. The network interface 204 can include one or more network interface cards (NICs). The display 206 may be a touchscreen display configured to provide visual output and receive touch input by touching the display 206 with a finger or stylus. The display 206 is configured to present, among other things, a keypad and a text input box, for example, as shown in FIGS. 1A-1D. The memory 206 includes data or instructions. As shown, the memory 206 stores typing applications 210.1-*n* and a keyboard display module 212.

The typing applications 210.1-*n* can include any application(s) that include typing via a keypad. Example typing applications 210.1-*n* include a word processing application, a text messaging application, an email application, a web browser application which allows for typing of web addresses and typing into input boxes, etc. The typing applications 210.1-*n* may invoke the keypad display module 212 to have a keypad presented on the display 206 so that the user of the touchscreen device 200 can type using the display 206.

The keypad display module 212, when executed, causes the processor 202 to display a keypad including multiple characters on the display 206. The keypad may be a QWERTY keypad or a foreign language keypad, for example, a Cyrillic keypad, a Hebrew keypad, or an Arabic keypad. The keypad display module 212 causes the processor 202 to receive a selection of one of the multiple characters on the keypad. For example, as shown in FIG. 1B, the user has selected the character 'q'. The selected character is then typed on the display 206, for example, in a text input box.

The keypad display module 212 invokes the character button resize module 214, included within the keypad display module 212, to cause the processor 202 to, for each character among the multiple characters on the keypad, predict a likelihood value that that the character is a next character to be typed and select a button size for the character based on the likelihood value. Character(s) that are more likely to be the next character to be typed may be assigned larger button sizes, for example, as illustrated in FIGS. 1A-1D. The keypad display module 212 causes the processor 202 to modify the keypad presented at the display 206 based on the selected button size for each character and to display the modified keypad on the display 206.

Figure 3A:
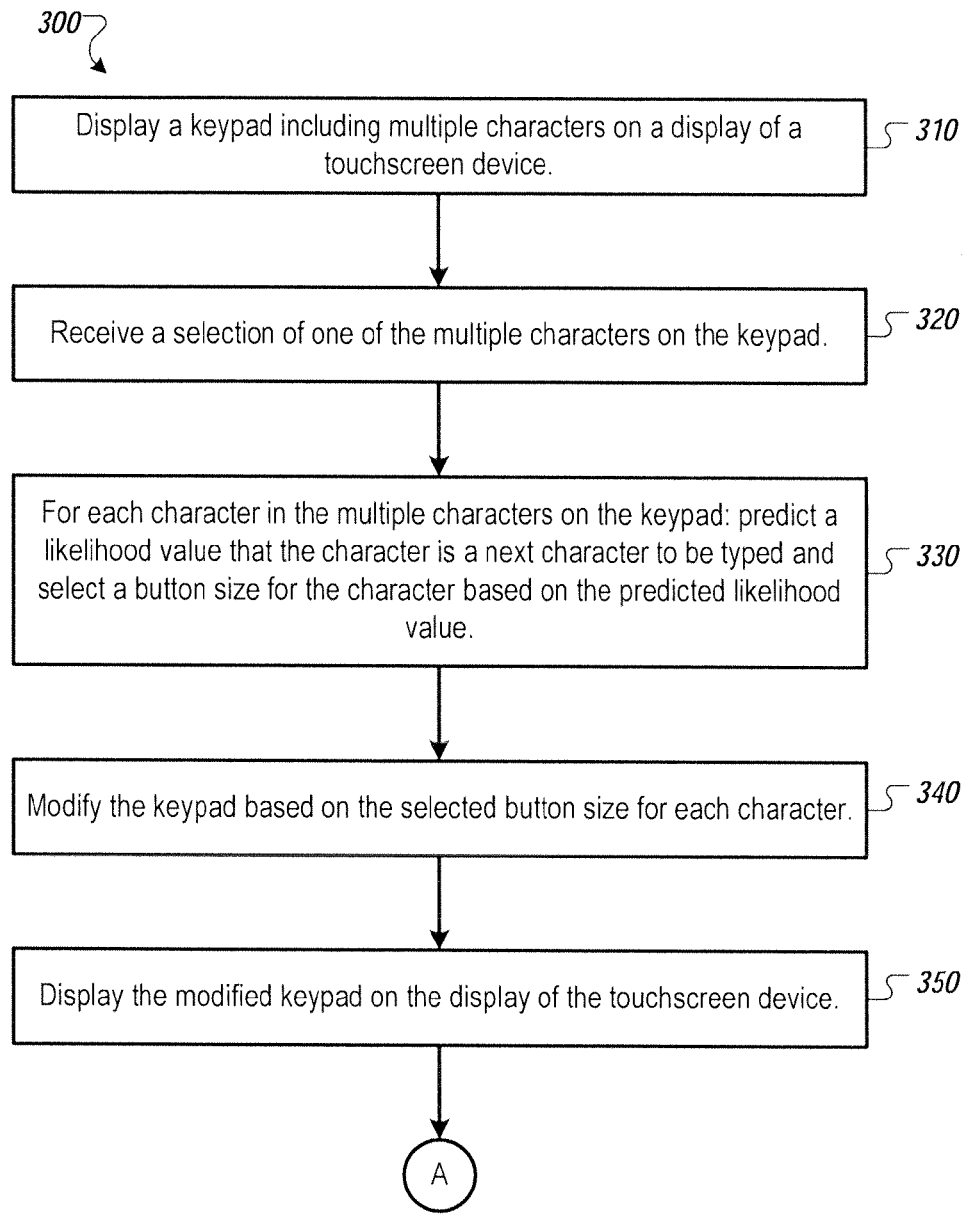
FIGS. 3A-3B illustrate an exemplary process for modifying a keypad displayed on a touchscreen device.
Figure 3B:
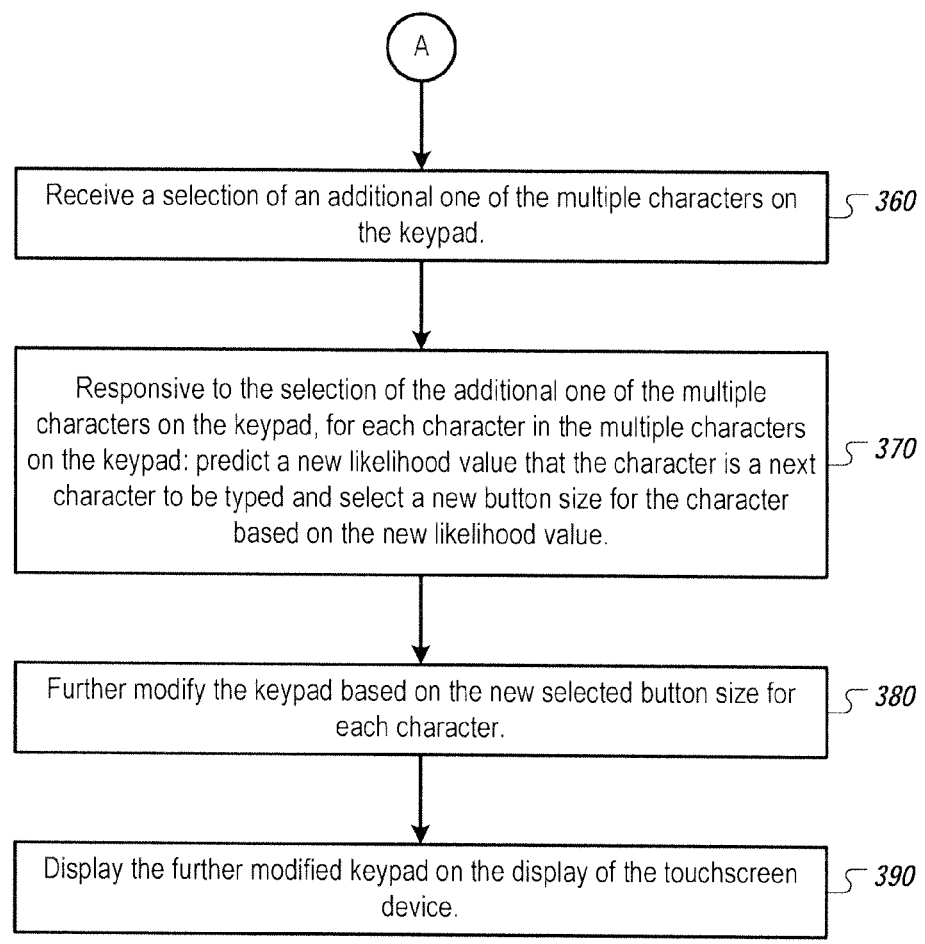

FIGS. 3A-3B illustrate an exemplary process 300 for modifying a keypad displayed on a touchscreen device. The keypad may correspond to one or more of the keypads 120A, 120B, 120C, or 120D illustrated in FIGS. 1A-1D. The touchscreen device may correspond to the touchscreen device 200 of FIG. 2.

As shown in FIG. 3A, the process 300 begins at step 310, where the touchscreen device displays a keypad (e.g., keypad 120A) including multiple characters on a display of the touchscreen device. The multiple characters may correspond to the characters in the Latin alphabet A-Z, as displayed on a QWERTY keypad. Alternatively, the multiple characters may correspond to foreign characters, for example, Cyrillic, Arabic, Hanzi or Kanji characters.

At step 320, the touchscreen device receives a selection of one of the multiple characters on the keypad. The one of the multiple characters may be selected by touching the button for the character with a finger or a stylus in order to type the character. For example, as illustrated in FIG. 1B, the user has selected the character 'Q', causing the letter 'q' to be typed in the text input box 110B.

At step 330, the touchscreen device, for each character in the multiple characters on the keypad, predicts a likelihood value that the character is a next character to be typed and selects a button size for the character based on the predicted likelihood value. The likelihood value may be predicted based on one or more previously typed characters, a set of words, and a word usage frequency. The set of words may include a set of words typed by the user, and the word usage frequency may include a word usage frequency of words typed by the user. Alternatively, the set of words may include a dictionary of a natural language (e.g., the English language), and the word usage frequency may include a word usage frequency of words in the natural language.

At step 340, the touchscreen device modifies the keypad based on the selected button size for each character. For example, as shown in the keypads 120A, 120B, 120C, and 120D of FIGS. 1A-1D, character buttons on the keypad may be increased or decreased in size according to the selected button size. In some examples, to ensure that a user is able to type without having to look at the display of the touchscreen device, a center position for each character button on the keypad may be predetermined and the size(s) of character button(s) on the keypad may be increased or decreased, relative to the center position, while maintaining and not changing the center position. In other words, the center position for each character button may be immutable.

Alternatively, center position(s) of character button(s) on the keypad may be modified. Modifying the center position of a character button may be useful if multiple adjacent character buttons are to be resized. For example, the character buttons for 'Q' and 'W' are adjacent to one another on a QWERTY keypad, with 'Q' being to the left of 'W'. If the button size for 'Q' is to be increased an the button size for 'W' is to be decreased, the right edge of the character button for 'Q' may be moved to the right and the left edge of the character button for 'W' may be moved to the right, modifying the center positions of the character buttons for 'Q' and 'W'.

In some examples, a total area on the display of the touchscreen device occupied by the keypad is constant throughout the modification(s) of the button size(s) for the character(s). Thus, if the button size for one character button (e.g., 'E') is increased, a button size for another character button (e.g., 'Z') may be decreased. For example, the keypad may occupy 30% of the total area of the display of the touchscreen device or the full length of the display of the touchscreen device and 30% of the height of the display of the touchscreen device.

At step 350, the touchscreen device displays the modified keypad on the display of the touchscreen device. At least one of the buttons on the modified keypad displayed at step 350 has a different size than at least one of the buttons on the keypad displayed at step 310. For example, the button size for the character 'U' is different in keypad 120A of FIG. 1A and keypad 120B of FIG. 1B.

As shown in FIG. 3B, at step 360, the touchscreen device receives a selection of an additional one of the multiple characters on the keypad. For example, the user may type another character in a word or phrase. The additional one of the multiple characters provided at step 360 may be the same as or different from the one of the multiple characters provided at step 320.

At step 370, the touchscreen device, responsive to the selection of the additional one of the multiple characters on the keypad, for each character in the multiple characters on the keypad, predicts a new likelihood value that the character is a next character to be typed and selects a new button size for the character based on the new likelihood value. The new likelihood value may be predicted based on one or more previously typed characters, a set of words, and a word usage frequency, as set forth above for the predicted likelihood value of step 330. However, the new likelihood value predicted at step 370 is also based on the additional character received at step 360.

At step 380, the touchscreen device further modifies the keypad based on the new selected button size for each character. For example, some of the buttons on the keypad may be made larger, while other buttons may be made smaller. Some buttons may maintain a constant size. For example, non-character buttons, including a SPACE, DELETE, ENTER, or SHIFT button, may, according to some implementations, not be resized using the process described herein, while some character buttons are resized. A character button may, in some cases, not be resized if its probability of corresponding to the next character to be typed does not change significantly.

At step 390, the touchscreen device displays the further modified keypad on the display. At least one of the buttons on the further modified keypad displayed at step 390 has a different size than at least one of the buttons on the modified keypad displayed at step 350. After step 390, the process 300 ends.

The process 300 is described above as including all of the steps 310-390 executed in numerical order. However, in some implementations, one or more of the steps 310-390 may be skipped. For instance, steps 310 and 320 may be skipped and the process 300 may begin at step 330 when a typing application is first instantiated and/or the keypad is first presented in the typing application. In this instance, the likelihood value that each character is the next character to be typed may correspond to the likelihood value that each character is a first character in a word to be typed. For example, the display 100A of FIG. 1A is presented before any characters are typed, as the touchscreen device predicts that there is a high likelihood that the enlarged button characters of 'E,', 'R', and 'S' will be the first character to be typed and a low likelihood that the smaller button characters of 'Q', 'Z', and 'X' will be the first character to be typed. The first character to be typed, similar to a non-first character to be typed, may be predicted based on an analysis of one or more of: a set of words typed by the user of the touchscreen device, a set of words typed by the user of the touchscreen device in a specified application, a set of first words typed into text input boxes by the user of the touchscreen device, a set of words in a dictionary of a default language of the touchscreen device, a set of words in a text (e.g., one or more books) in the default language of the touchscreen device, etc. In an additional implementation, the process 300 may be terminated after step 350, for example, if no additional characters are typed by the user after step 350 is completed. After step 390, the process 300 ends.

The keypad button resizing techniques described herein may be convenient for some users of touchscreen devices, but may be a nuisance or inconvenience for other users. To this effect, an option may be provided in the settings application of the touchscreen device to enable or disable keypad button resizing. Upon enabling keypad button resizing, the user may be notified that his/her typing patterns may be analyzed for the purpose of predicting the next character that he/she will type and resizing the keypad accordingly. If the user provides his/her permission, the user may withdraw his/her permission at any time, for example, by disabling keypad button resizing in the settings application of the touchscreen device. In addition, in some cases, a user may type faster than a processing speed required for the touchscreen device to resize characters on the keypad. In these cases, keypad button resizing may be automatically disabled until the user reduces his/her typing speed.

Various modifications of the techniques described herein may be used in conjunction with the subject technology. In some cases, a character button may be increased in size by a predetermined amount (e.g. 1%) each time the character button is used and/or decreased in size by a predetermined amount (e.g., 5%) each time the character button is not used for a certain number of typed characters (e.g., 1000 characters). For example, if a user types 1000 characters and these 1000 characters do not include the letter 'X', the character button for 'X' may be decreased by 5%, as this typing pattern indicates that the user rarely uses the letter 'X'. In some cases, a character button may be increased in size by a predetermined amount (e.g., 3%) every threshold number (e.g., ten) times the corresponding character is typed. Each character button may be sized between a predetermined minimum size (e.g., 25-50% of the original size) and a predetermined maximum size (e.g., 150%-200% of the original size).

In some implementations, the character button size(s) for either the entire keyboard or for each character button may be periodically reset to ensure that a recent typing history of a user is used to determine the character button size(s). This reset may be manually activated to a default state in which either the button sizes are equal or a default state in which the button sizes are different and set by the aforementioned dictionary and word-frequency chart. Alternatively, the reset may be automatically activated to such a default state based on occurrence of an event such as a specific amount of time elapsing (e.g., a week or month) or a particular number of words typed (e.g., 10,000 words) in various input boxes, as indicated by a word counter. Additionally, there may be an option to use a rolling count of inputs. This option would use a defined set of user typed words (e.g. 10,000 words); as new words are entered, the oldest words would be disregarded in order to accommodate the recently typed words. Such a system would ensure the keyboard reflects the user's most recent typing patterns as usage may change over time (e.g. switching jobs).

In some implementations, a touchscreen device may have different personas, with each persona indicative of either a different user with a different user account or the same user in a different situation (e.g., home, work, traveling). For example, a home tablet computer may have an account for a husband, an account for a wife, and an account for a child. Each of the personas may be associated with different button sizes based on the typing history in the associated persona. For example, the wife may type different words with different characters than the child, and thus have different button sizes from the child. One or more of the husband, the wife, or the child may disable keypad button resizing for his/her persona.

In some examples, only character buttons for characters which are used above a threshold frequency (e.g., once every 300 characters) may appear on the keypad, thereby permitting button sizes to be further enlarged for characters that are being used. An additional button may be provided to access character buttons for characters that do not appear on the keypad in an alternate keyboard. Alternatively, a single button may be used for two or more characters, each of which is used below the threshold frequency, and the user may need to implement multiple presses or cycle through multiple options to select the correct character button. As a result, an amount of space available for frequently used character buttons may be increased.

Figures 4, 5:
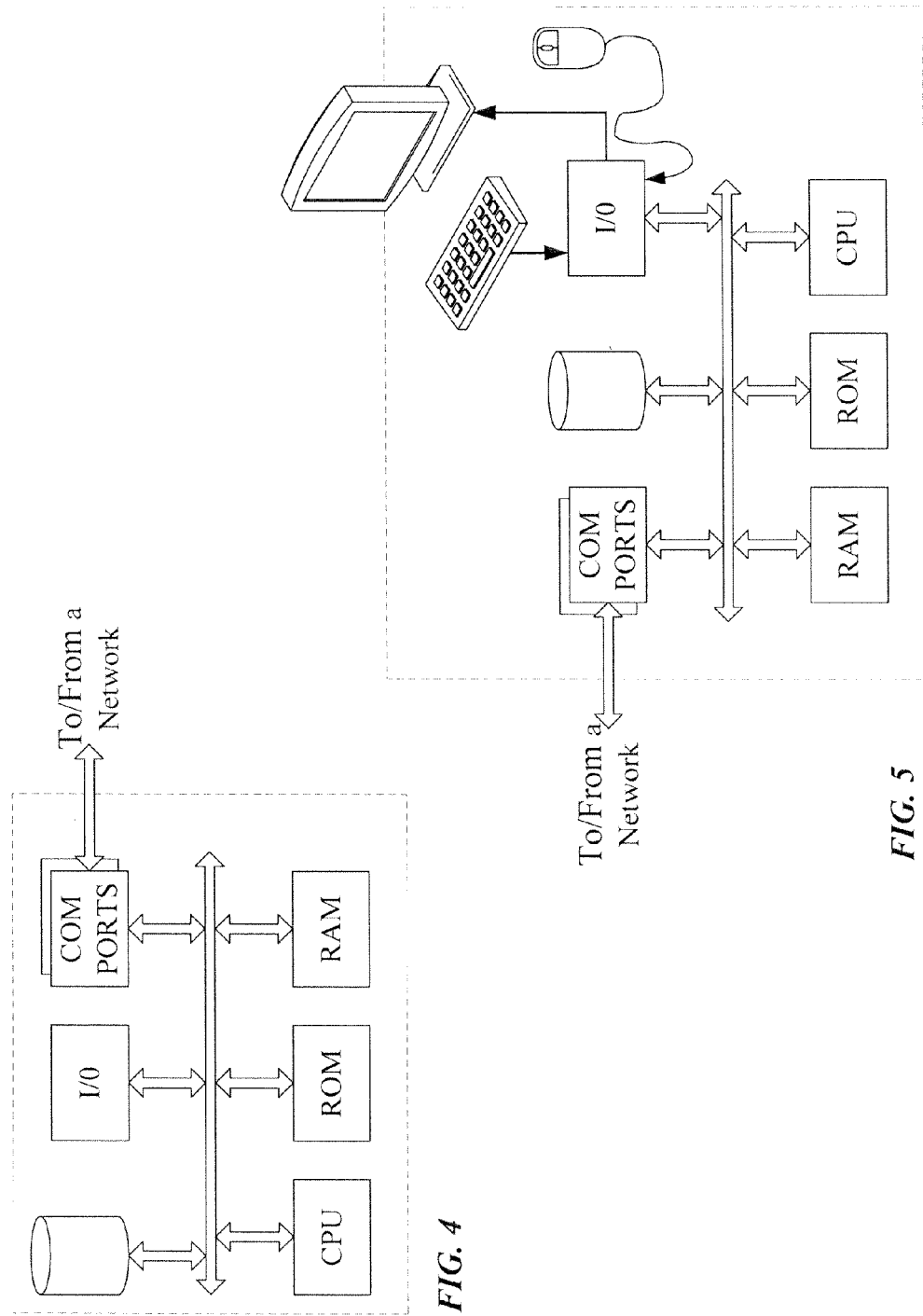
FIG. 4 is a simplified functional block diagram of a computer that may be configured to function as the touchscreen device shown in FIG. 2.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   detecting a request from a user of a touchscreen device to display a keypad including a plurality of characters on a display of the touchscreen device;
   determining whether keypad button resizing is enabled for the keypad on the touchscreen device; and
   only while keypad button resizing is enabled,
      responsive to detecting the request and before a first character is typed on the keypad, predicting a likelihood value for each character in the plurality of characters on the keypad that the character will be the first character to be typed after displaying the keypad and selecting a button size for the character based on the predicted likelihood value;
      displaying the keypad on the display of the touchscreen device, wherein the keypad is arranged based on the selected button size for each character;
      receiving a selection of one of the plurality of characters on the keypad;
      responsive to the receiving of the selection, for each character in the plurality of characters on the keypad, predicting a new likelihood value that the character is a next character to be typed and selecting a new button size for the character based on the new likelihood value;
      modifying the keypad based on the new selected button size for each character;
      displaying the modified keypad on the display of the touchscreen device; and
      automatically disabling keypad button resizing for the keypad on the touchscreen device when the user types at a typing speed exceeding a typing speed threshold that corresponds to a processing speed at which the touchscreen device performs one or more operations that are performed only while keypad button resizing is enabled.

2. The method of claim 1, wherein predicting the likelihood value includes predicting the likelihood value that the character is the first character to be typed based on one or more previously-typed characters, a set of words, and a word usage frequency.

3. The method of claim 2, wherein:
   the set of words comprises a set of words previously typed by the user on the touchscreen device, and
   the word usage frequency comprises a word usage frequency of words previously typed by the user on the touchscreen device.

4. The method of claim 2, wherein:
   the set of words comprises a dictionary of a natural language, and
   the word usage frequency comprises a word usage frequency of words in the natural language.

5. The method of claim 1, further comprising, for each character in the plurality of characters on the keypad, predetermining a center position for a button for the character before selecting the button size for the character.

6. The method of claim 5, wherein the center position for the button for each character is immutable.

7. The method of claim 5, further comprising modifying a center position for a specified character upon determining that a button size for the specified character is to be modified and that a button size for a character adjacent to the specified character in a predetermined order of characters on the keypad is to be modified.

8. The method of claim 1, wherein a total area on the display of the touchscreen device occupied by the keypad is equal to a total area on the display of the touchscreen device occupied by the modified keypad.

9. The method of claim 2, wherein the set of words includes a dynamic set of user-typed words, the dynamic set continuously updated to include a rolling count of a predefined number of words most recently typed by the user.

10. The method of claim 1, further comprising automatically re-enabling keypad button resizing subsequent to the automatic disabling of the keypad button resizing, the automatic re-enabling performed when the user ceases the typing at the typing speed exceeding the typing speed threshold.

11. A touchscreen device comprising:
    one or more processors;
    a display; and
    a memory storing instructions which, when executed by the one or more processors, cause the one or more processors to:
       determine whether keypad button resizing is enabled for the keypad on the touchscreen device; and
       only while keypad button resizing is enabled,
          predict, before a first character is typed on a keypad, a likelihood value for each character in a plurality of characters on the keypad that the character will be the first character to be typed after displaying the keypad and select a button size for the character based on the predicted likelihood value;
          display the keypad on the display of the touchscreen device, wherein the keypad is arranged based on the selected button size for each character;
          receive a selection of one of the plurality of characters on the keypad;
          responsive to the receiving of the selection, for each character in the plurality of characters on the keypad, predict a new likelihood value that the character is a next character to be typed and selecting a new button size for the character based on the new likelihood value;
          modify the keypad based on the new selected button size for each character;
          display the modified keypad on the display of the touchscreen device; and
          automatically disable keypad button resizing for the keypad on the touchscreen device when a user types at a typing speed exceeding a typing speed threshold that corresponds to a processing speed at which the touchscreen device performs one or more operations that are performed only while keypad button resizing is enabled.

12. The touchscreen device of claim 11, the memory further storing instructions which, when executed by the one or more processors, cause the one or more processors to:
   detect a request to display the keypad including the plurality of characters on the display of a touchscreen device, wherein the instructions cause the one or more processors to predict the likelihood value for each character in the plurality of characters in response to the detecting of the request.

13. A non-transitory computer-readable medium storing instructions for one or more computers to:
   detect a request from a user of a touchscreen device to display a keypad including a plurality of characters on a display of the touchscreen device;
   determine whether keypad button resizing is enabled for the keypad on the touchscreen device; and
   only while keypad button resizing is enabled,
      responsive to detecting the request and before a first character is typed on the keypad, predict a likelihood value for each character in the plurality of characters on the keypad that the character will be the first character to be typed after displaying the keypad and select a button size for the character based on the predicted likelihood value;
      display the keypad on the display of the touchscreen device, wherein the keypad is arranged based on the selected button size for each character;
      receive a selection of one of the plurality of characters on the keypad;
      responsive to the receiving of the selection, for each character in the plurality of characters on the keypad, predict a new likelihood value that the character is a next character to be typed and selecting a new button size for the character based on the new likelihood value;
      modify the keypad based on the new selected button size for each character;
      display the modified keypad on the display of the touchscreen device; and
   automatically disable keypad button resizing for the keypad on the touchscreen device when the user types at a typing speed exceeding a typing speed threshold that corresponds to a processing speed at which the touchscreen device performs one or more operations that are performed only while keypad button resizing is enabled.

14. The computer-readable medium of claim 13, wherein the instructions to predict the likelihood value include instructions to predict the likelihood value that the character is the first character to be typed based on one or more previously-typed characters, a set of words, and a word usage frequency.

15. The computer-readable medium of claim 14, wherein the set of words comprises a set of words previously typed by the user on the touchscreen device, and the word usage frequency comprises a word usage frequency of words previously typed by the user on the touchscreen device.

16. The computer-readable medium of claim 14, wherein the set of words comprises a dictionary of a natural language, and wherein the word usage frequency comprises a word usage frequency of words in the natural language.

17. The computer-readable medium of claim 13, further storing instructions for the one or more computers to, for each character in the plurality of characters on the keypad, predetermine a center position for a button for the character before selecting the button size for the character.

18. The computer-readable medium of claim 17, wherein the center position for the button for each character is immutable.

19. The computer-readable medium of claim 17, further storing instructions for the one or more computers to modify a center position for a specified character upon determining that a button size for the specified character is to be modified and that a button size for a character adjacent to the specified character in a predetermined order of characters on the keypad is to be modified.

20. The computer-readable medium of claim 13, further storing instructions for the one or more computers to automatically re-enable keypad button resizing subsequent to automatically disabling the keypad button resizing when the user ceases typing at the typing speed exceeding the typing speed threshold.

* * * * *